(12) United States Patent
Huang et al.

(10) Patent No.: US 8,264,158 B2
(45) Date of Patent: Sep. 11, 2012

(54) PROTECTION CIRCUIT FOR ALTERNATING CURRENT LIGHT EMITTING DIODE

(76) Inventors: Tai-Hsiang Huang, Yongkang (TW); Kuan-Hsiang Huang, Yongkang (TW)

( * ) Notice: Subject to any disclaimer, the term of this patent is extended or adjusted under 35 U.S.C. 154(b) by 262 days.

(21) Appl. No.: 12/591,691

(22) Filed: Nov. 30, 2009

(65) Prior Publication Data
US 2011/0127920 A1  Jun. 2, 2011

(51) Int. Cl.
*H05B 37/00* (2006.01)
(52) U.S. Cl. ..... 315/192; 315/127; 315/122; 315/185 R; 315/291
(58) Field of Classification Search ............. 315/185 R, 315/192, 200 R, 205, 210, 291, 312, 22, 123, 315/127; 345/82, 102, 211; 362/227, 249.02, 362/249.06
See application file for complete search history.

(56) References Cited

U.S. PATENT DOCUMENTS

| | | | | |
|---|---|---|---|---|
| 5,457,450 A | * | 10/1995 | Deese et al. | 340/912 |
| 7,262,752 B2 | * | 8/2007 | Weindorf | 345/82 |
| 7,902,761 B2 | * | 3/2011 | Ang et al. | 315/194 |

* cited by examiner

*Primary Examiner* — Haiss Philogene
(74) *Attorney, Agent, or Firm* — Rosenberg, Klein & Lee (57) ABSTRACT

The present invention relates to a protection circuit for an alternating current light emitting diode which mainly comprises light emitting diodes placed in series and parallel with loads in a light emitting diode lamp device. When one of the light emitting diodes has been damaged, the current flows through the load in parallel with the light emitting diode and flows to the next light emitting diode. Only the damaged light emitting diode is off to keep from causing an open circuit in the overall circuitry and to prevent the overall lamp device from turning off and not emitting light. In addition to the device being easier to use, finding the damaged light emitting diode for replacement is faster, easier and more convenient when repairing the damaged light emitting diode, thereby greatly enhancing the usefulness and practicability of the protection circuit for an alternating current light emitting diode.

10 Claims, 8 Drawing Sheets

PROTECTION CIRCUIT FOR ALTERNATING CURRENT LIGHT EMITTING DIODE

BACKGROUND OF THE INVENTION

1. Field of the Invention

The present invention relates to a protection circuit for an alternating current light emitting diode, and particularly to Dual In-line Package (DIP) or Surface Mount Device (SMD) alternating current light emitting diode lamp devices. When using an alternating current light emitting diode lamp device, the present invention can prevent the overall lamp device from being unable to emit light when a damaged light emitting diode causes an open circuit during usage. In addition to the device being easier to use, finding the damaged light emitting diode for replacement is faster, easier and more convenient when repairing the damaged light emitting diode, thereby greatly enhancing the usefulness and practicability of the protection circuit for an alternating current light emitting diode.

2. Brief Description of the Prior Art

Ever since the development of the Light Emitting Diode (LED), it has been able to emit light using very little electrical energy and also has relatively low power consumption, thereby effective in significantly reducing the use of energy resources. In addition, light emitting diodes also have other advantages such as being small in volume, long-lived, having a fast reaction rate, having good anti-shock characteristics, good single color quality, etc. making light emitting diodes accepted to be used worldwide. Therefore, an effort was started in the industry for various developments and improvements of light emitting diodes to further make it more commonly used.

Figure 8:
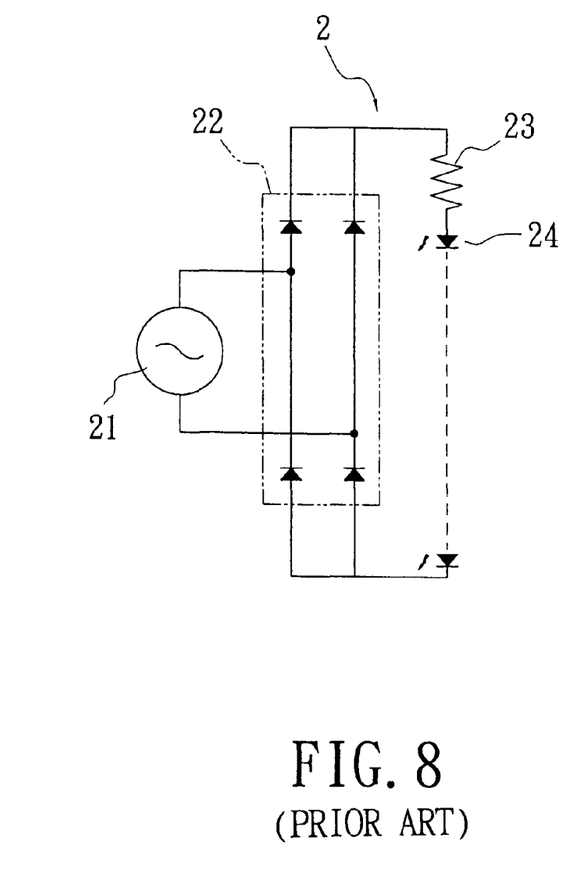
FIG. 8 illustrates a schematic circuit diagram of a conventional circuit.

Regarding general Dual In-line Package (DIP) or Surface Mount Device (SMD) alternating current light emitting diode lamp devices, please refer to FIG. 8 illustrating a schematic circuit diagram of a conventional circuit. The light emitting diode lamp device 2 mainly has a power plug 21 with rectifiers 22 connected on both ends thereon, and a current limiting resistor 23 and a plurality of light emitting diodes 24 are placed in series with the rectifiers 22. When using the light emitting diode lamp device 2, the power plug 21 is plugged into an electrical power outlet. After electricity is supplied through the power plug 21, an alternating current is rectified by the rectifier 22 forming a direct current, which is then limited by the current limiting resistor 23 to provide the necessary power to light up each light emitting diode 24 placed in series, thereby allowing each light emitting diode 24 to receive power to emit light.

However, even if the aforementioned light emitting diode lamp device is able to perform the expected effect of lighting up each light emitting diode placed in series after being supplied with electricity from an electrical power outlet, it was realized, during practical application of the device, that each of the light emitting diodes of the light emitting diode lamp device are arranged in series, thereby forming a loop for the current to flow through and light up each light emitting diode. If a single or a number of light emitting diodes in the series are damaged, the current is unable to flow through the damaged light emitting diode, thus causing an open circuit in each light emitting diode placed in series in the overall light emitting diode lamp device. Since each light emitting diode placed in series is unable to form a loop, each light emitting diode placed in series is unable to emit light. Not only is the usage of the device cumbersome and inconvenient, a measuring tool is needed to measure the status of each and every single light emitting diode during repairs to replace the damaged light emitting diode, thereby wasting a significant amount of time and making operation difficult, thus there is room for improvement during overall implementation of the device.

Therefore, pertaining to the conventional structures and lack of improvement thereof, the inventor provides a protection circuit for an alternating current light emitting diode to achieve the object of better practicability.

SUMMARY OF THE INVENTION

The protection circuit for an alternating current light emitting diode of the present invention mainly comprises light emitting diodes placed in series and parallel with loads in a light emitting diode lamp device. When one of the light emitting diodes has been damaged, the current flows through the load in parallel with the light emitting diode and flows to the next light emitting diode. Only the damaged light emitting diode is off to keep from causing an open circuit in the overall circuitry, and to prevent the overall lamp device from turning off and not emitting light. In addition to the device being easier to use, finding the damaged light emitting diode for replacement is faster, easier and more convenient when repairing the damaged light emitting diode, thereby greatly enhancing the usefulness and practicability of the protection circuit for an alternating current light emitting diode.

DETAILED DESCRIPTION OF THE PREFERRED EMBODIMENT

Figure 1:
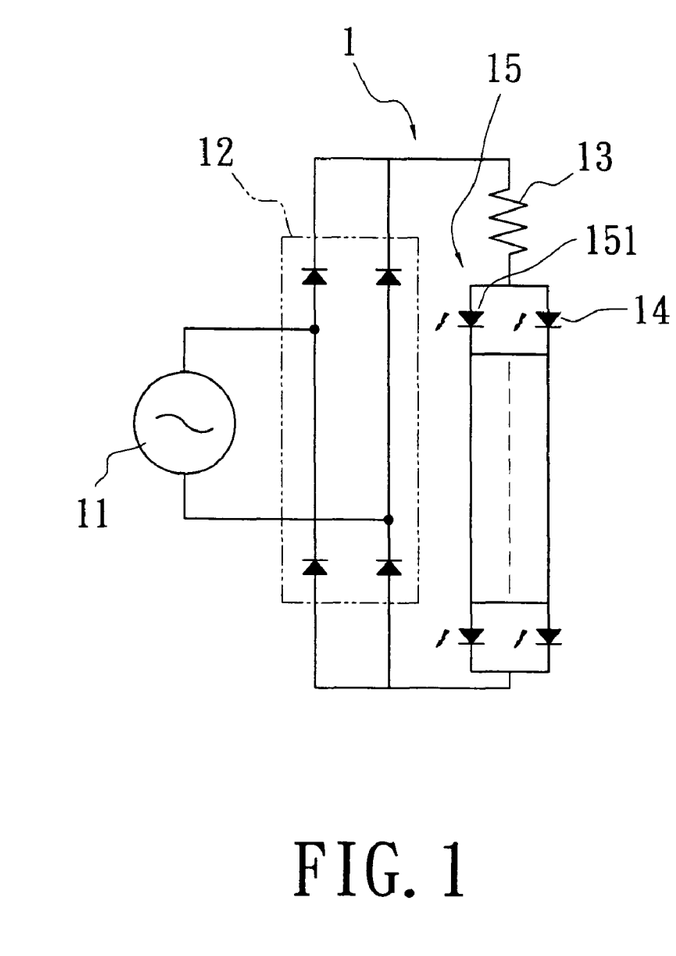
FIG. 1 illustrates a schematic circuit diagram of the first embodiment of the present invention.

First, refer to FIG. 1 illustrating a schematic circuit diagram of the first embodiment of the present invention. The light emitting diode lamp device 1 of the present invention has a power plug 11 with rectifiers 12 connected on both ends thereon. A current limiting resistor 13 and a plurality of light emitting diodes 14 are placed in series with the rectifiers 12, wherein each light emitting diode 14 is in parallel with a load 15, and the impedance of the load 15 is greater than or equal to the impedance of the light emitting diode 14.

Figure 2:
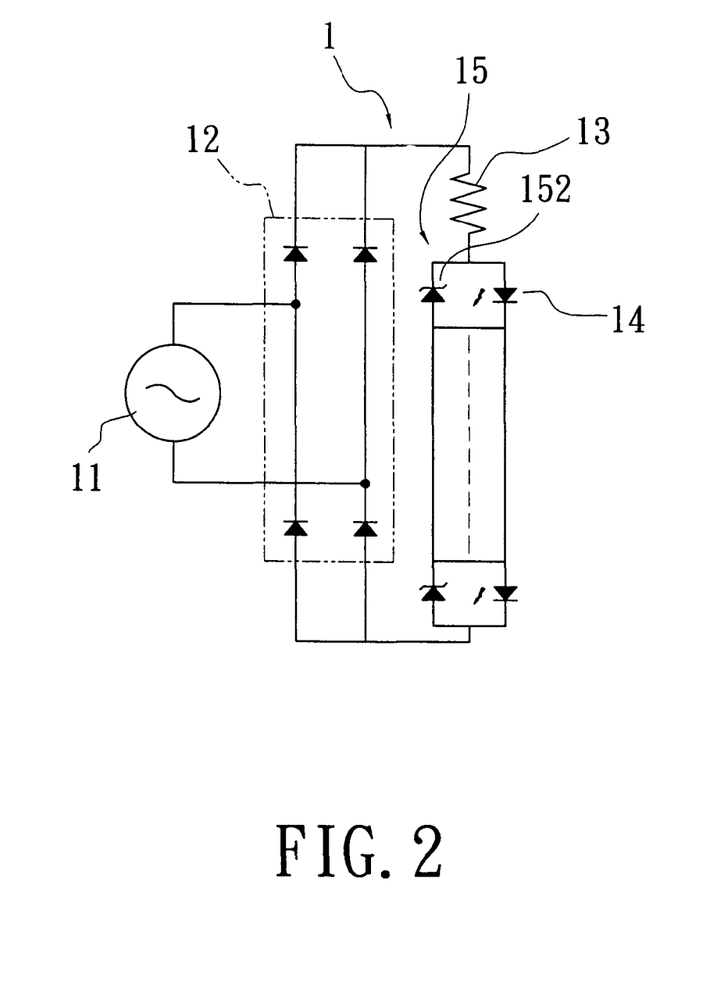
FIG. 2 illustrates a schematic circuit diagram of the second embodiment of the present invention.
Figure 3:
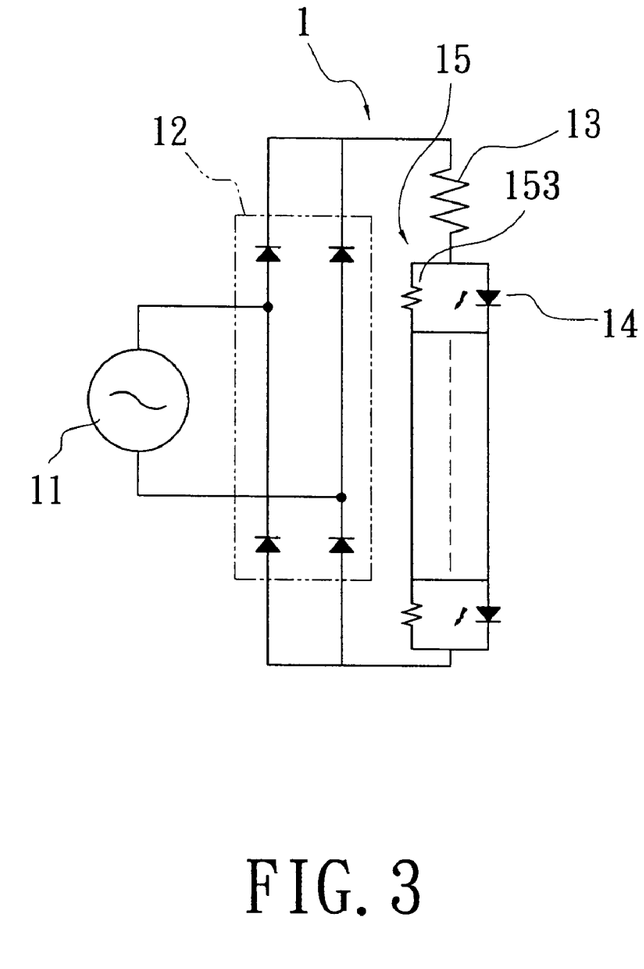
FIG. 3 illustrates a schematic circuit diagram of the third embodiment of the present invention.
Figure 4:
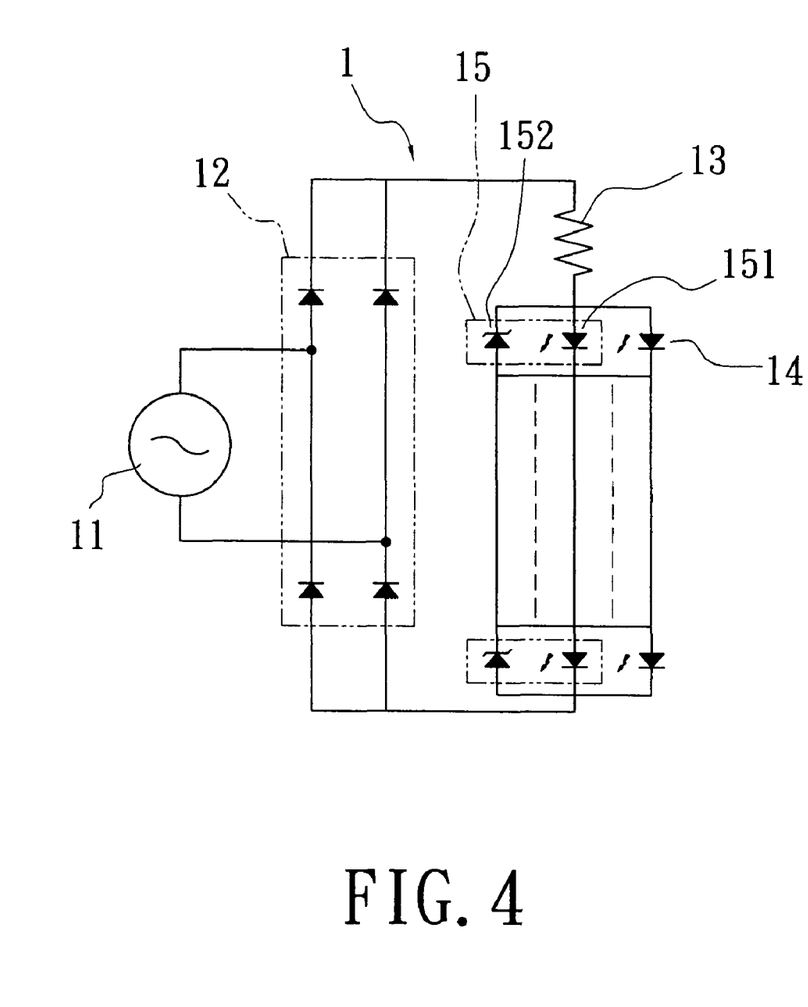
FIG. 4 illustrates a schematic circuit diagram of the fourth embodiment of the present invention.
Figure 5:
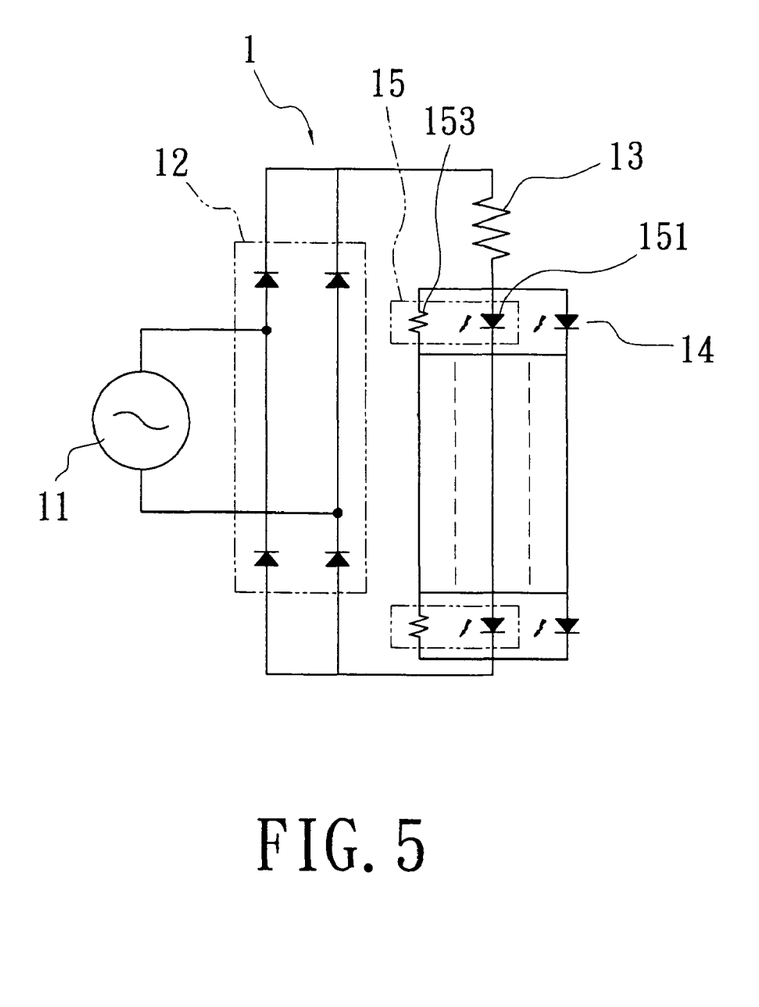
FIG. 5 illustrates a schematic circuit diagram of the fifth embodiment of the present invention.
Figure 6:
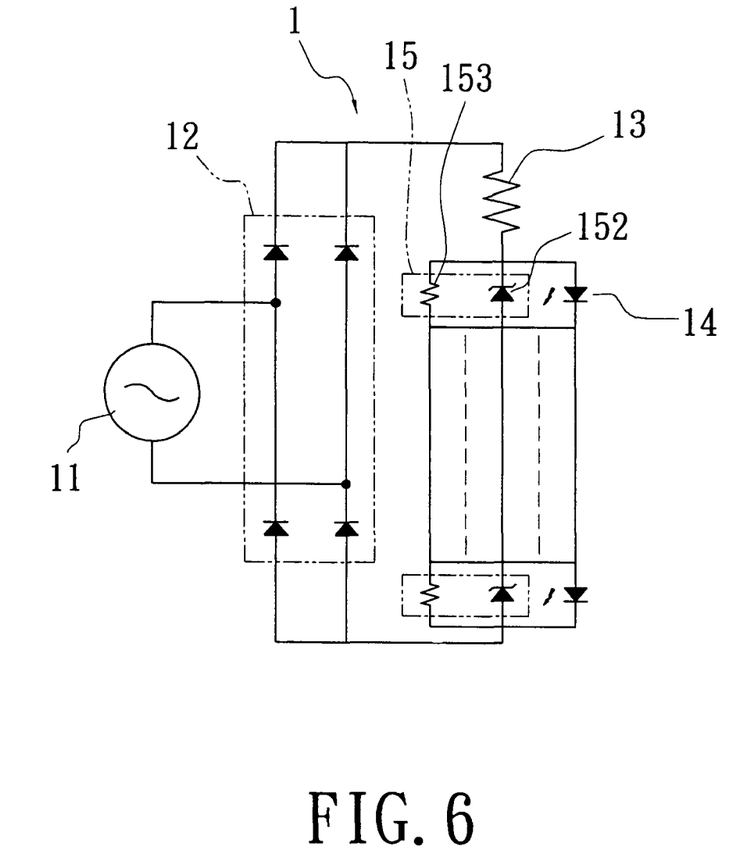
FIG. 6 illustrates a schematic circuit diagram of the sixth embodiment of the present invention.
Figure 7:
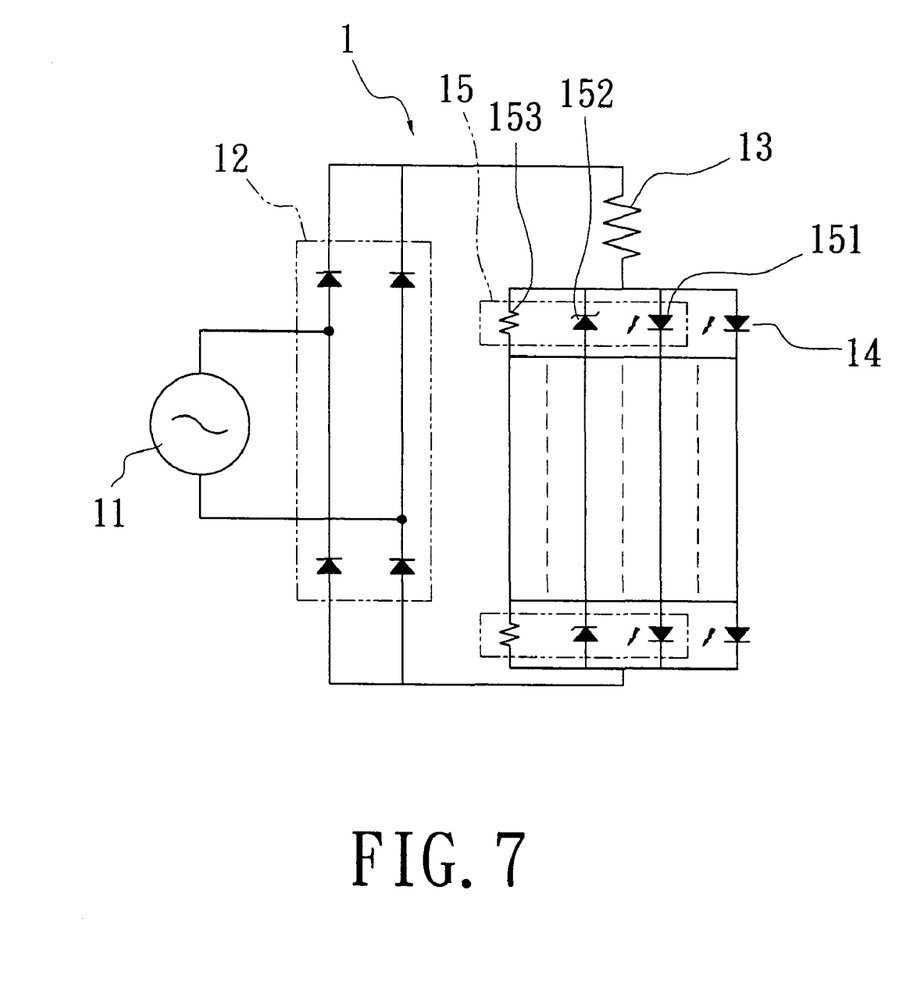
FIG. 7 illustrates a schematic circuit diagram of the seventh embodiment of the present invention.

The load 15 may be another light emitting diode 151 as referring to FIG. 1, a Zener diode 152 as referring to FIG. 2, a resistor 153 as referring to FIG. 3, or following arrangements of another light emitting diode 151 in parallel with the Zener diode 152 as referring to FIG. 4, another light emitting diode 151 in parallel with the resistor 153 as referring to FIG. 5, the Zener diode 152 in parallel with the resistor 153 as referring to FIG. 6, or another light emitting diode 151 and the Zener diode 152 and the resistor 153 all in parallel with each other as referring to FIG. 7.

Accordingly, the impedance of the load 15 is greater than or equal to the impedance of the light emitting diodes 14 when a current flows through the light emitting diodes 14 and the load 15 in parallel with the light emitting diodes 14 during the use of the light emitting diode lamp device 1 of the present invention, thereby enabling the majority of the current to flow through the light emitting diodes 14 or to evenly flow through the light emitting diodes 14 and the load 15 leaving the brightness of the light emitting diodes 14 unaffected. However, when one of the light emitting diodes 14 has been damaged, the current flows through the load 15 in parallel with the light emitting diode 14 and flows to the next light emitting diode 14. Only the damaged light emitting diode 14 is off to keep from causing an open circuit in the overall circuitry and to prevent all the light emitting diodes 14 from turning off and not emitting light.

The foregoing preferred embodiments of the present invention are illustrated of the present invention rather than limiting of the present invention. As is understood by a person skilled in the art, it is intended to cover various modifications and similar arrangements included within the spirit and scope of the appended claims.

As described above, the composition of the architecture and descriptions can be understood through the comparison of the present invention to conventional architecture. The present invention mainly comprises light emitting diodes placed in series and parallel with loads in a light emitting diode lamp device. When one of the light emitting diodes has been damaged, the current flows through the load in parallel with the light emitting diode and flows to the next light emitting diode. Only the damaged light emitting diode is off to keep from causing an open circuit in the overall circuitry and to prevent the overall lamp device from turning off and not emitting light. In addition to the device being easier to use, finding the damaged light emitting diode for replacement is faster, easier and more convenient when repairing the damaged light emitting diode, thereby greatly enhancing the usefulness and practicability of the protection circuit for an alternating current light emitting diode.

Finally, those skilled in the art should appreciate that they can readily use the disclosed conception and specific embodiments as a basis for designing or modifying other structures for carrying out the same purposes of the present invention without departing from the spirit and scope of the invention as defined by the appended claims.

What is claimed is:

1. A protection circuit for an alternating current light emitting diode of a light emitting diode lamp device, comprising:
   a power plug with rectifiers connected on both ends thereon;
   a current limiting resistor; and
   a plurality of light emitting diodes placed in series with the rectifiers, the current limiting resistor supplying current to the light emitting diodes;
   wherein each light emitting diode is in parallel with a load and the load for each light emitting diode selectively conducting current therethrough upon failure of the light emitting diode.

2. The protection circuit for an alternating current light emitting diode according to claim 1, wherein an impedance of the load is greater than an impedance of the light emitting diode.

3. The protection circuit for an alternating current light emitting diode according to claim 1, wherein the impedance of the load is equal to the impedance of the light emitting diode.

4. The protection circuit for an alternating current light emitting diode according to claim 1, wherein the load is another light emitting diode.

5. The protection circuit for an alternating current light emitting diode according to claim 1, wherein the load is a Zener diode.

6. The protection circuit for an alternating current light emitting diode according to claim 1, wherein the load is a resistor.

7. The protection circuit for an alternating current light emitting diode according to claim 1, wherein the load is an arrangement of another light emitting diode in parallel with the Zener diode.

8. The protection circuit for an alternating current light emitting diode according to claim 1, wherein the load is an arrangement of another light emitting diode in parallel with the resistor.

9. The protection circuit for an alternating current light emitting diode according to claim 1, wherein the load is an arrangement of the Zener diode in parallel with the resistor.

10. The protection circuit for an alternating current light emitting diode according to claim 1, wherein the load is an arrangement of another light emitting diode and the Zener diode and the resistor in parallel with each other.

* * * * *